(12) United States Patent
Van Der Hulst

(10) Patent No.: US 9,261,233 B2
(45) Date of Patent: Feb. 16, 2016

(54) DEVICE FOR DISPENSING CHARGES OF A FLUID

(71) Applicant: Willem Van Der Hulst, Gironico (IT)

(72) Inventor: Willem Van Der Hulst, Gironico (IT)

(73) Assignee: GROENEVELD TRANSPORT EFFICIENCY B.V., Gorinchem (NL)

(*) Notice: Subject to any disclaimer, the term of this patent is extended or adjusted under 35 U.S.C. 154(b) by 0 days.

(21) Appl. No.: 14/395,159

(22) PCT Filed: Apr. 17, 2013

(86) PCT No.: PCT/NL2013/050274
§ 371 (c)(1),
(2) Date: Oct. 17, 2014

(87) PCT Pub. No.: WO2013/157940
PCT Pub. Date: Oct. 24, 2013

(65) Prior Publication Data
US 2015/0069090 A1 Mar. 12, 2015

(30) Foreign Application Priority Data

Apr. 19, 2012 (NL) ..................................... 2008659

(51) Int. Cl.
| | | |
|---|---|---|
| *F16N 13/02* | (2006.01) | |
| *F16N 11/08* | (2006.01) | |
| *F16N 27/02* | (2006.01) | |
| *G01F 11/04* | (2006.01) | |
| *G01F 11/06* | (2006.01) | |
| *F16N 27/00* | (2006.01) | |

(52) U.S. Cl.
CPC ................ *F16N 13/02* (2013.01); *F16N 11/08* (2013.01); *F16N 27/02* (2013.01); *G01F 11/04* (2013.01); *F16N 27/00* (2013.01); *G01F 11/06* (2013.01)

(58) Field of Classification Search
CPC ......... F16N 11/08; F16N 11/10; F16N 7/385; F16N 13/02; F16N 27/00; F16N 27/02; F16N 3/12; F16N 5/02; G01F 11/04; G01F 11/06

USPC ......... 222/249, 253, 256, 263, 309, 387, 333; 184/105.2

See application file for complete search history.

(56) References Cited

U.S. PATENT DOCUMENTS

| | | | | | |
|---|---|---|---|---|---|
| 2,533,281 | A | * | 12/1950 | Oliveau | .................... 222/136 |
| 2,882,999 | A | * | 4/1959 | Morgan | ..................... 184/7.2 |

(Continued)

FOREIGN PATENT DOCUMENTS

| | | |
|---|---|---|
| EP | 0 608 951 | 8/1994 |
| GB | 1 381 199 | 1/1975 |
| NL | 2008659 | 4/2012 |

OTHER PUBLICATIONS

International Search Report dated Aug. 2, 2013, corresponding to PCT/NL2013/050274.

*Primary Examiner* — Frederick C Nicolas
(74) *Attorney, Agent, or Firm* — Young & Thompson

(57) ABSTRACT

A device (1) for dispensing charges of a fluid includes a housing (2) provided with a first (3) and a second (4) inlet for a first and a second flow of fluid to flow into the device. First and second fluid communication elements (9, 10) are arranged between the first (3) and second (4) inlets and a first chamber (6). A piston (11) in the first chamber (6) is arranged for keeping the first and the second flows separated. A plunger (13) in a second chamber (14) is arranged for establishing alternately a first charge out of the first flow and a second charge out of the second flow. Third (17), fourth (18) and fifth (19) fluid communication elements arranged between the first and the second chambers and an outlet (20) in cooperation with the piston and the plunger enable alternately dispensing the first and second charges at the outlet.

12 Claims, 6 Drawing Sheets

(56) References Cited

U.S. PATENT DOCUMENTS

| | | | |
|---|---|---|---|
| 2,996,147 A * | 8/1961 | Callahan | 184/7.4 |
| 3,552,606 A | 1/1971 | Kraft et al. | |
| 4,966,306 A * | 10/1990 | Credle et al. | 222/1 |
| 5,058,768 A * | 10/1991 | Lichfield | 222/1 |
| 5,538,407 A * | 7/1996 | Van Der Hulst | 417/401 |
| 2004/0226969 A1* | 11/2004 | Shew | 222/333 |

* cited by examiner

DEVICE FOR DISPENSING CHARGES OF A FLUID

FIELD OF THE INVENTION

The invention relates to a device for dispensing charges of a fluid and a system comprising such a device.

DESCRIPTION OF THE RELATED ART

In the prior art, fluid proportioning systems are known wherein a constant charge of fluid has to be dispensed in a centrally controlled manner at quite a large number of places, always to some extent independently of a feed pressure. An example is a grease lubricating system of the type used in vehicles. In such a system it is important that a charge of grease should be fed to a different number of lubrication points, e.g. bearing points, after a certain time, or after, for example, a number of braking applications. A larger or smaller charge of grease may be required, depending on the type of bearing. To enable such accurate proportioning, use is made of a known device in which a piston moves to and fro as a result of alternately applying pressure pulses to respectively a first and a second inlet of the device.

The piston in the known device is moved from a first position to a second position by the fluid to be dispensed at an outlet of the device through applying a first pressure pulse to a first inlet of the device. The piston is moved back to the first position by a control fluid through applying a second pressure pulse to a second inlet of the device. The control fluid only acts to control valve means and to effect the return movement of the piston, i.e. movement of the piston from the second to the first position.

Applying the first pressure pulse on the first inlet of the known device results in forming a charge of the fluid that will eventually be dispensed at the outlet. Applying the second pressure pulse to the second inlet of the known device enables returning the piston to the first position and to control the valve means such that the charge of the fluid to be dispensed is ready at the outlet. By applying another pressure pulse to the first inlet, the piston is moved again to the second position. As a result, the charge of fluid to be dispensed that was ready at the outlet is pressed out of the device and a next charge of the fluid to be dispensed is being formed. By consecutively applying yet another pressure pulse to the second inlet, the next charge is rendered ready at the outlet. It will be clear to the skilled person that by applying pressure pulses to alternately the first and second inlets the device operates according to a scheme consisting of forming a charge of fluid to be dispensed, followed by providing this charge to be ready at the outlet and finally forming a next charge and at the same time dispensing the previously formed charge at a lubrication point such as a bearing. Hence, when the device is used for the first time a first charge is dispensed at the outlet the second time a pressure pulse is being applied to the first inlet. When in use, a charge is dispensed at the outlet every time a pressure pulse is applied to the first inlet. As application of a pressure pulse to the second inlet results in moving back of the piston from the second to the first position and providing the formed charge to be ready at the outlet, it will be clear that the control fluid will never be dispensed at the outlet and thus can be a different fluid than the fluid to be dispensed which is provided at the first inlet.

With a known device as described above, a single system can be provided for dispensing grease to a large number or a small number of lubrication points. This is important in particular in body-building of vehicles, because with a single universal system various vehicles can be provided with a different number of lubrication points. Such a system also allows using thick lubricating grease which has as an advantage that it runs less quickly out of the bearing. In addition, thicker grease seals the bearing better relative to the environment. As a result, a lower grease consumption can be achieved. Apart from cost aspects, environmental considerations play an important role.

SUMMARY OF THE INVENTION

It would be advantageous to have an improved device for dispensing charges of a fluid. To better address this concern, a first aspect of the invention provides a device for dispensing charges of a fluid comprising a housing provided with a first inlet arranged for allowing a first flow of a fluid to be proportioned to flow into the device;

a second inlet arranged for allowing a second flow of said fluid to flow into the device;

a first fluid communication means that is arranged for establishing fluid communication between the first inlet and a first chamber;

a second fluid communication means that is arranged for establishing fluid communication between the second inlet and the first chamber;

a piston that is provided in the first chamber and is arranged for keeping the first and the second flows separated;

a plunger that is provided in a second chamber and is arranged for establishing alternately a first charge out of the first flow and a second charge out of the second flow;

an outlet for said first and second charges; and a third, a fourth and a fifth fluid communication means that are arranged for enabling fluid communication between the first and the second chambers and the outlet, wherein the third, the fourth and the fifth fluid communication means, the piston and the plunger are arranged for alternately dispensing the first and the second charges at the outlet of the device.

In this way a device can be provided that has a simpler construction than prior art devices in terms of parts required for dispensing a charge of fluid at the outlet for lubricating a point, e.g. a bearing. Therefore, the device according to the present invention is more robust and more reliable than devices known from the prior art. When the device is used for the first time, applying for example a first pressure pulse to the first inlet results in forming the first charge of the fluid to be dispensed. Next, upon applying a second pressure pulse to the second inlet results on the one hand in forming of a second charge of the fluid to be dispensed and on the other hand in dispensing the first charge at the outlet of the device. It will be clear to the skilled person that the sequence of applying the pulses to the respective inlets can also be reversed. When in operation, applying a pressure pulse to the first inlet results on the one hand in the formation of a charge of the fluid to be dispensed out of a flow of this fluid that enters the device via the first inlet and on the other hand in dispensing a charge of fluid that has been formed out of a flow of the fluid to be dispensed that has entered the device via the second inlet as a result of a pressure pulse that has been applied to the second inlet. Consecutively applying a pressure pulse to the second inlet results on the one hand in the formation of a charge of the fluid to be dispensed out of a flow of this fluid that enters the device via the second inlet and on the other hand in dispensing a charge of fluid that has been formed out of a flow of the fluid to be dispensed that has entered the device via the first inlet as a result of a pressure pulse that has been applied to the first inlet. It is thus clear to the skilled person that the device enables dispensing of a charge of fluid, e.g. grease, upon every pressure pulse that alternately is applied to the first and the second inlets. In addition, fluid that enters the device through either one of both inlets is dispensed at the outlet to a lubrication point. Furthermore, this device may enable to apply different kinds of fluids that may alternately be dispensed at the outlet of the device. Therefore, the efficiency of the device has been enhanced with respect to devices known from the prior art.

The third, the fourth and the fifth fluid communication means, the piston and the plunger may be arranged for dispensing the first charge at the outlet depending on the second flow flowing into the device via the second inlet and for successively dispensing the second charge at the outlet depending on the first flow flowing into the device via the first inlet. In this way charges of fluid to be dispensed may be dispensed alternately at the outlet of the device. In the case that the fluid to be dispensed is grease, it is possible to lubricate for example bearings.

The piston and the plunger may be arranged for being movable alternately by the first and the second flows. The piston and the plunger can for example be provided with stepped profiles such that the first and second fluid flows can exert respectively a first force and a second force on them to move them to and fro in respectively the first and second chambers. The piston and the plunger may be arranged for moving in a same direction. In Quantities of the first and/or second charges may depend on dimensions of the plunger with respect to dimensions of the second chamber. By modifying the dimensions of the plunger, for example its height in a longitudinal direction of the device, the quantities of the first and/or the second charges may be determined. The longitudinal dimensions of the plunger may be modified by providing for example fitting rings. It is also possible to determine different quantities for the first and the second charges. For example by modifying the dimensions of the plunger by only providing fitting rings or the like to one side of the plunger, the first and the second charges will be different.

The first inlet may be connected with a first end portion of the first chamber via the first fluid communication means and the second inlet may be connected with a second end portion of the first chamber via the second fluid communication means. The plunger may define at a first side of the plunger, a first part of the second chamber and may define at a second side of the plunger, a second part of the second chamber. The first side of the plunger may be arranged for being controllable by the first flow of the fluid to be proportioned and the second side of the plunger may be arranged for being controllable by the second flow of said fluid. The third fluid communication means may be arranged for connecting the first chamber with the first part of the second chamber. The fourth fluid communication means may be arranged for connecting the first chamber with the second part of the second chamber. The fifth fluid communication means may be arranged for connecting the first chamber with the outlet. The piston and the plunger may be arranged for being movable by the first flow of the fluid to be proportioned in a first direction providing a first flow path for said first flow between the first inlet and the first part of the second chamber via the first and the third fluid communication means and a second flow path for the second charge of the fluid to be proportioned between the second part of the second chamber and the outlet via the fourth and the fifth fluid communication means. The piston and the plunger may be movable by the second flow of the fluid to be proportioned in a second direction providing a third flow path for said second flow between the second inlet and the second part of the second chamber via the second and the fourth fluid communication means and a fourth flow path for the first charge of the fluid to be proportioned between the first part of the second chamber and the outlet via the third and the fifth fluid communication means. In this way a device is provided capable of dispensing charges of a fluid at the outlet wherein the charges alternately have entered the device via the first and the second inlets. This device may also enable to apply different kinds of fluids that may alternately be dispensed at the outlet of the device. This might be advantageous for certain applications.

A first non-return valve may be provided between the outlet and the fifth fluid communication means to prevent the first and the second charges from flowing back into the device via the fifth fluid communication means. A second and a third non-return valve may be provided between the first chamber and respectively the first and the second fluid communication means to prevent flowing back of the first and second flows towards respectively the first and the second inlets. In this way undesired effects due to flowing back of fluid can be prevented.

The piston may comprise a first side arranged for being controllable by the first flow of the fluid to be proportioned and a second side arranged for being controllable by the second flow of said fluid. The first and the second sides of the plunger may for example be stepped such that respectively the first and the second flows can exert forces on them such that the plunger can be moved to and fro in the second chamber.

The piston may be provided with protrusions that are in adjoining contact with an inner wall of the first chamber. In this way the piston enables on the one hand the formation of the first and second charges out of the first and second flows. On the other hand the piston enables the separation of the first charge, the second charge, the first flow and the second flow in the first chamber of the device.

The piston may be accommodated in a sleeve forming the first chamber and the plunger is accommodated in an annular space between the sleeve and a first part of the housing forming the second chamber.

In another aspect, the invention provides a system for dispensing charges of a fluid comprising at least one device set forth.

It will be appreciated by those skilled in the art that two or more of the above-mentioned embodiments, implementations, and/or aspects of the invention may be combined in any way deemed useful.

Modifications and variations of the device and/or of the system according to the present invention, which correspond to the described modifications and variations of the device and/or the system set forth, can be carried out by a skilled person on the basis of the present description.

BRIEF DESCRIPTION OF THE DRAWINGS

The invention will be explained in more detail below with reference to drawings in which an illustrative embodiment of the invention is shown. The person skilled in the art will realize that other alternatives and equivalent embodiments of the invention can be conceived and reduced to practice without departing from the scope of the present invention. In the drawings, FIG. 1a shows the exemplary embodiment of the device in a first position in which no fluid is present inside the device.

FIG. 1c also shows that a first charge has been dispensed at an outlet of the device after having flown towards the outlet via the third and a fifth fluid communication means under influence of the second fluid flow described above.

FIG. 1d also shows that a second charge has been dispensed at the outlet of the device after having flown towards the outlet via the fourth and the fifth fluid communication means under influence of the third fluid flow.

The figures are not necessarily drawn to scale. In the figures identical components are denoted by the same reference numerals.

DETAILED DESCRIPTION OF THE PREFERRED EMBODIMENTS

Figure 1A:
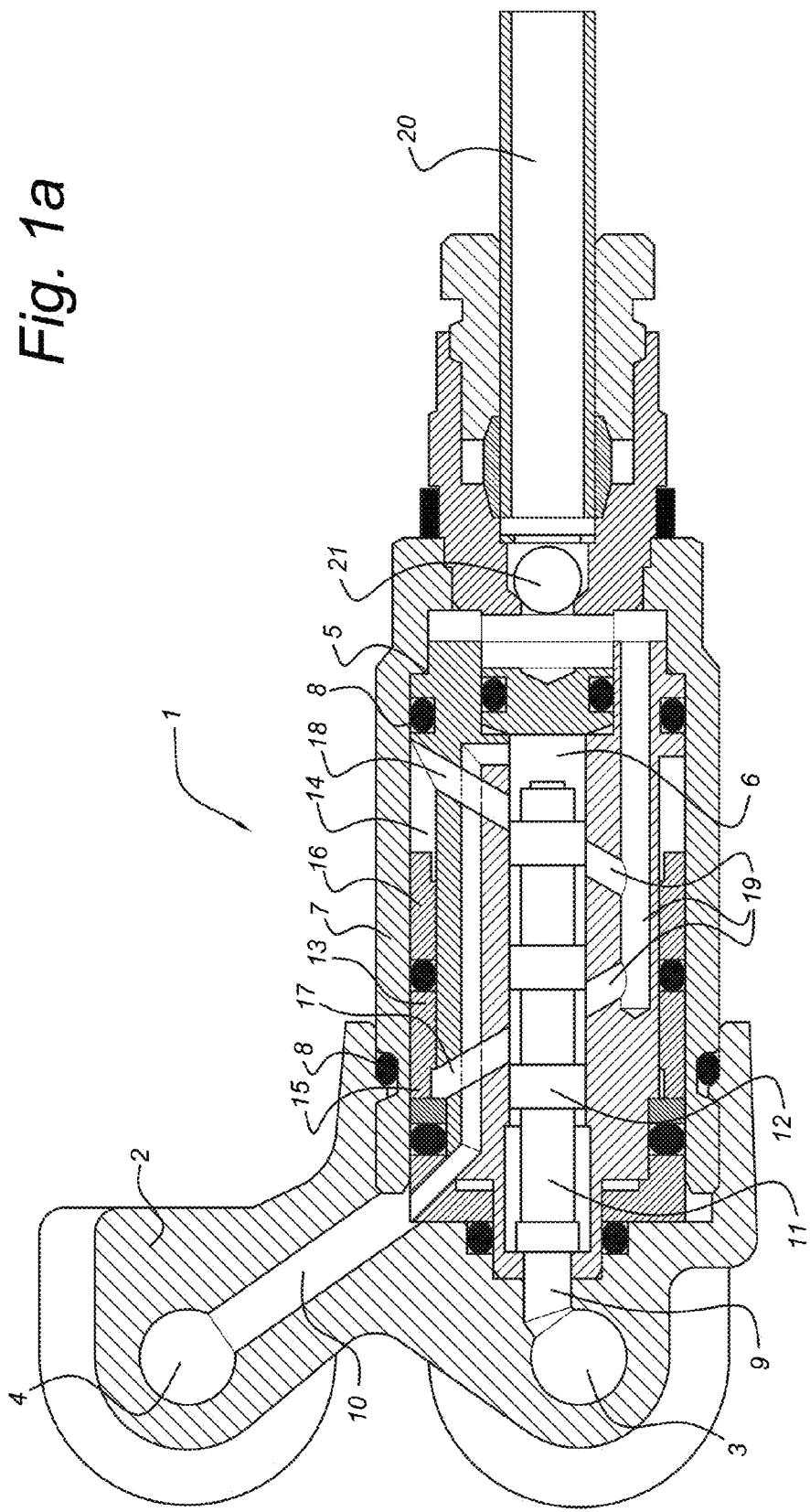
FIG. 1a shows a schematic cross section of an exemplary embodiment of the device according to the present invention.

The device 1 shown in FIGS. 1a-1e comprises a housing 2 provided with a first inlet 3 arranged for allowing a first flow of a fluid to be proportioned to flow into the device 1 and a second inlet 4 arranged for allowing a second flow of said fluid to flow into the device 1. Both the first 3 and second 4 inlets are inlets for a fluid to be proportioned such as a grease. In operation of the device 1 the first 3 and second 4 inlets can be placed alternately under pressure. A sleeve 5 forming a first chamber 6 is confined in a sealing manner in the housing 2 by means of a first part 7 of the housing 2. The first part 7 may for example be a screw cap. It is well known to the skilled person that sealing can be achieved by applying sealing rings 8, e.g. O-rings, at appropriate locations. A first fluid communication means 9, e.g. a channel, is arranged for establishing fluid communication between the first inlet 3 and a first end portion of the first chamber 6. A second fluid communication means 10, e.g. a channel, is arranged for establishing fluid communication between the second inlet 4 and a second end portion of the first chamber 6.

A piston 11 is provided in the first chamber 6. The piston 11 that is stepped is movable to and fro within the first chamber 6. The piston 11 is provided with protrusions 12 that are in adjoining contact with an inner wall of the first chamber 6. The protrusions 12 provide a point of application for, alternately, the first flow as a result of which the piston 11 is movable in a first direction and for the second flow as a result of which the piston 11 is movable in a second direction. In this exemplary embodiment the first direction is opposite to the second direction. Furthermore, the protrusions 12 are arranged for keeping the first and the second flows separated in the first chamber 6.

A plunger 13 is provided in a second chamber 14 bounded between the sleeve 5 and the first part 7 of the housing 2. The plunger 13 is movable to and fro in this chamber and is arranged for establishing alternately a first charge out of the first flow and a second charge out of the second flow. The plunger 13 defines at a first side 15 thereof a first part of the second chamber 14 and at a second side 16 of the plunger 13 a second part of the second chamber 14. The first side 15 of the plunger 13 is arranged for being controllable by the first flow of the fluid to be proportioned whereas the second side 16 of the plunger 13 is arranged for being controllable by the second flow of said fluid.

A third fluid communication means 17 is arranged for connecting the first chamber 6 with the first part of the second chamber 14 and a fourth fluid communication means 18 is arranged for connecting the first chamber 6 with the second part of the second chamber 14. A fifth fluid communication means 19 is arranged for connecting the first chamber 6 with an outlet 20 at which the first and second charges can be dispensed to for example a part to be lubricated. A first non-return valve 21 is provided between the outlet 20 and the fifth fluid communication means 19 to prevent the first and the second charges from flowing back into the device via the fifth fluid communication means 19.

The third 17, fourth 18 and fifth 19 fluid communication means, the piston 11 and the plunger 13 are arranged for alternately dispensing the first and the second charges at the outlet 20. The piston 11 and the plunger 13 are arranged for being movable by the first flow of the fluid to be proportioned in a first direction providing a first flow path for said first flow between the first inlet 3 and the first part of the second chamber 14 via the first fluid communication means 9, the first end portion of the first chamber 6 and the third fluid communication means 17 and a second flow path for the second charge of the fluid to be proportioned between the second part of the second chamber 14 and the outlet 20 via the fourth fluid communication means 18, the first chamber 6 and the fifth fluid communication means 19. The piston 11 and the plunger 13 are movable by the second flow of the fluid to be proportioned in a second direction providing a third flow path for said second flow between the second inlet 4 and the second part of the second chamber 14 via the second fluid communication means 10, the second end portion of the first chamber 6 and the fourth fluid communication means 18 and a fourth flow path for the first charge of the fluid to be proportioned between the first part of the second chamber 14 and the outlet 20 via the third fluid communication means 17, the first chamber 6 and the fifth fluid communication means 19.

The device shown in FIGS. 1a-1d works as follows. Starting from the first position of the device shown in FIG. 1a, a first pressure pulse is exerted on the first inlet 3, while it is possible for pressure to be released through the second inlet 4. As a result, piston 11 will be moved by the first flow of the fluid to be proportioned and dispensed, e.g. a grease, from a first position shown in FIG. 1a to a second position shown in FIG. 1b. By moving the piston 11 to its second position, the first flow path for the first flow between the first inlet 3 and the first part of the second chamber 14 via the first fluid communication means 9, the first end portion of the first chamber 6 and the third fluid communication means 17 is provided. Hence, the first part of the second chamber 14 may be filled and the plunger 13 is moved from a first position shown in FIG. 1a to a second position shown in FIG. 1b. At the same time, the second flow path between the second part of the second chamber 14 and the outlet 20 via the fourth fluid communication means 18, the first chamber 6 and the fifth fluid communication means 19 is provided. No fluid is dispensed at the outlet 20 as the second part of the second chamber 14 has not yet been filled.

Figure 1B:
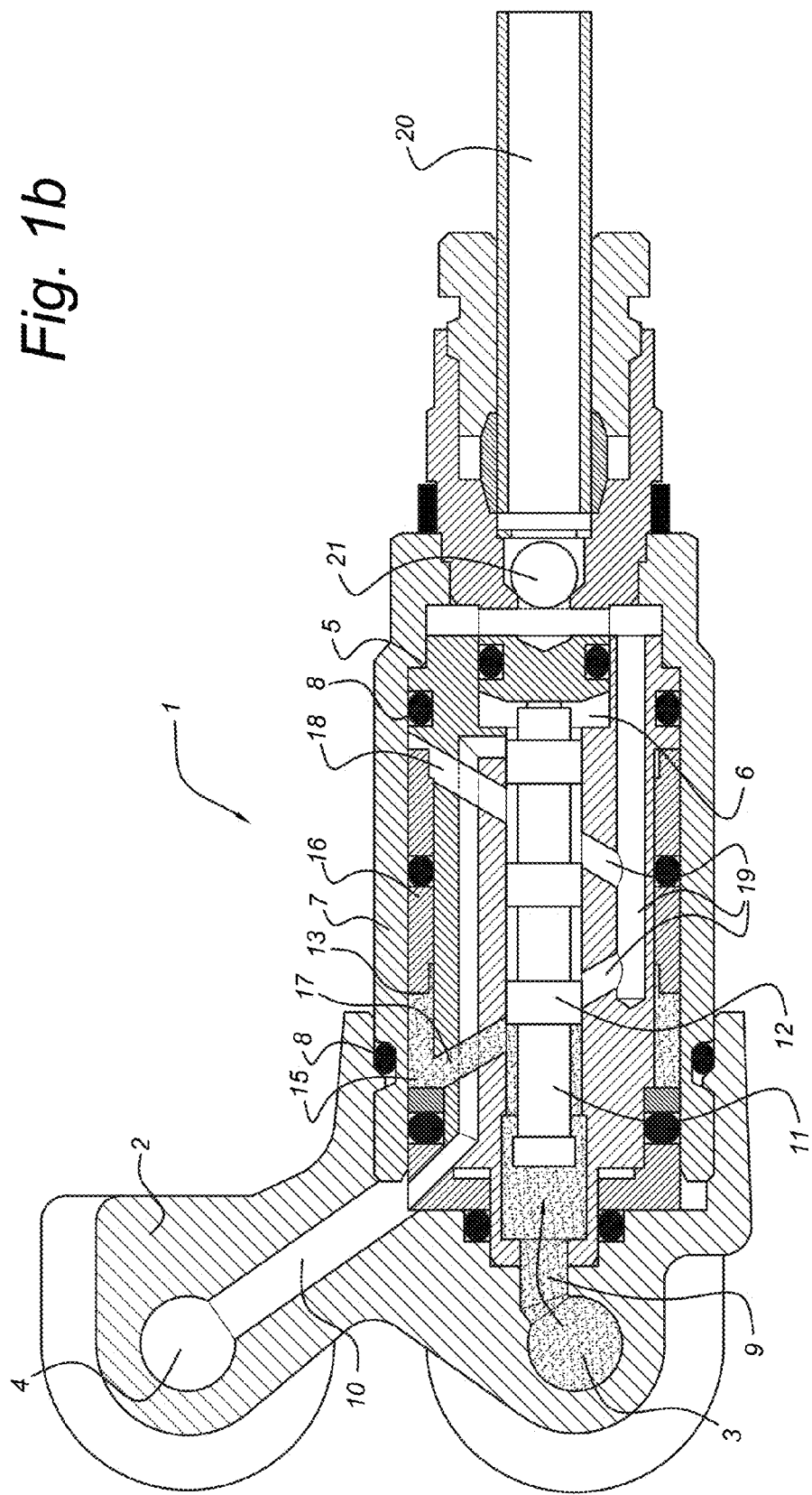
FIG. 1b shows the schematic cross section of the exemplary embodiment of the device of FIG. 1a in a second position in which a first fluid flow has flown into a first part of a first chamber and into a first part of a second chamber via a first inlet and via a first and a third fluid communication means.
Figure 1C:
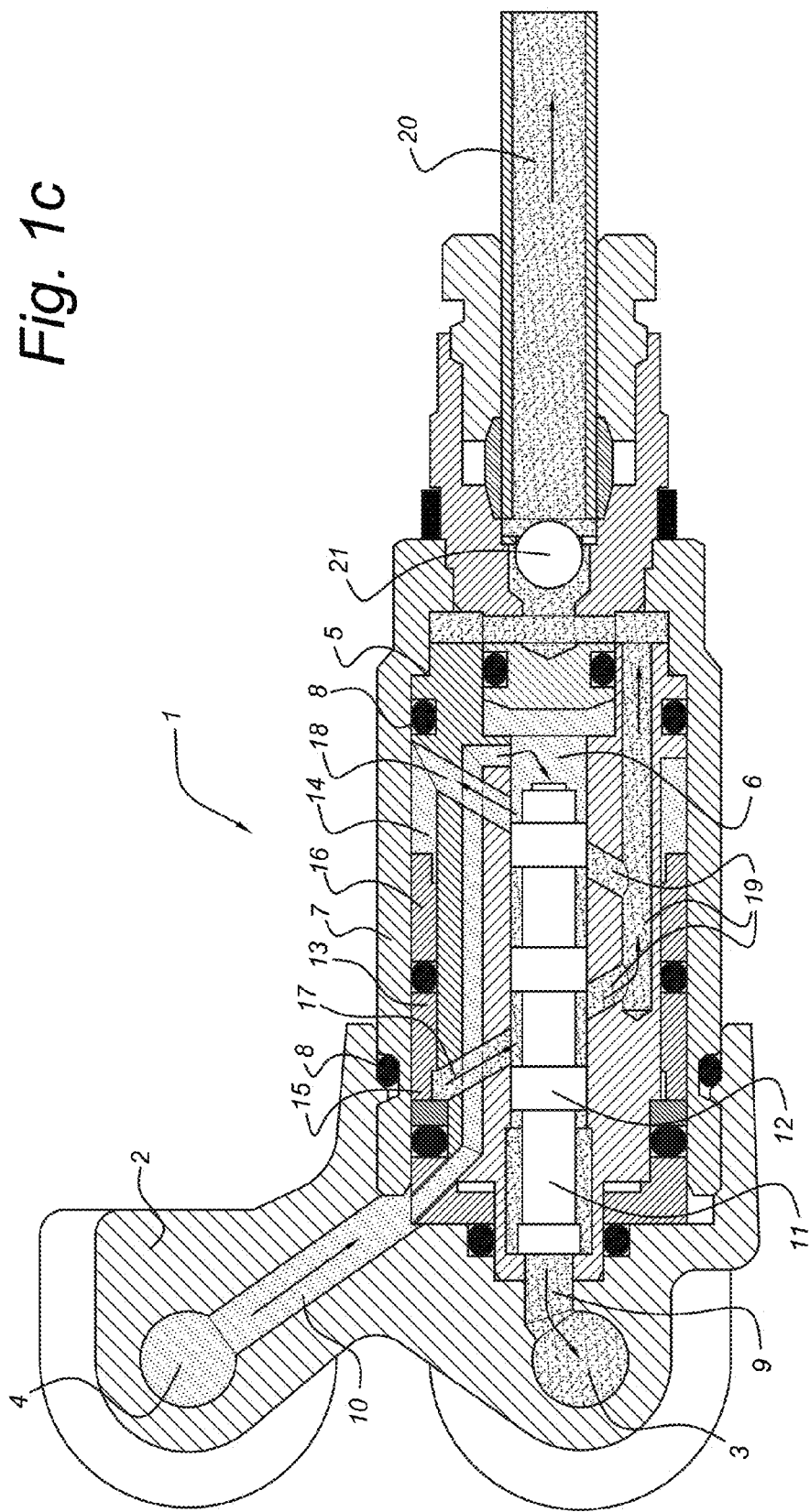
FIG. 1c shows the schematic cross section of the exemplary embodiment of the device of FIG. 1a in a third position in which a second fluid flow has flown into a second part of the first chamber and into a second part of the second chamber via a second inlet and via a second and a fourth fluid communication means.

Starting from the second position of the device shown in FIG. 1b, a second pressure pulse is exerted on the second inlet 4, while it is possible for pressure to be released through the first inlet 3. As a result, piston 11 will be moved from the second position shown in FIG. 1b back to its first position shown in FIG. 1c. By moving piston 11 back to its first position the third flow path for the second flow of the fluid to be proportioned between the second inlet 4 and the second part of the second chamber 14 via the second fluid communication means 10, the second end portion of the first chamber 6 and the fourth fluid communication means 18 is provided. In addition, the first flow path between the first inlet 3 and the first part of the second chamber 14 via the first fluid communication means 9, the first end portion of the first chamber 6 and the third fluid communication means 17 is closed off. In this way a first charge out of the first flow of fluid to be proportioned is established.

The second part of the second chamber 14 may be filled with the second flow of fluid to be proportioned via the third plow path. Upon filling of the second part of the second chamber 14, the plunger 13 is moved from the second position shown in FIG. 1b back to the first position shown in FIG. 1c and the first charge is pressed out of the first part of the second chamber 14 via the fourth flow path between the first part of the second chamber 14 and the outlet 20 via the third fluid communication means 17 and the fifth fluid communication means 19. The first charge of fluid is thus dispensed at the outlet 20 for lubricating a part, for example a bearing point.

Figure 1D:
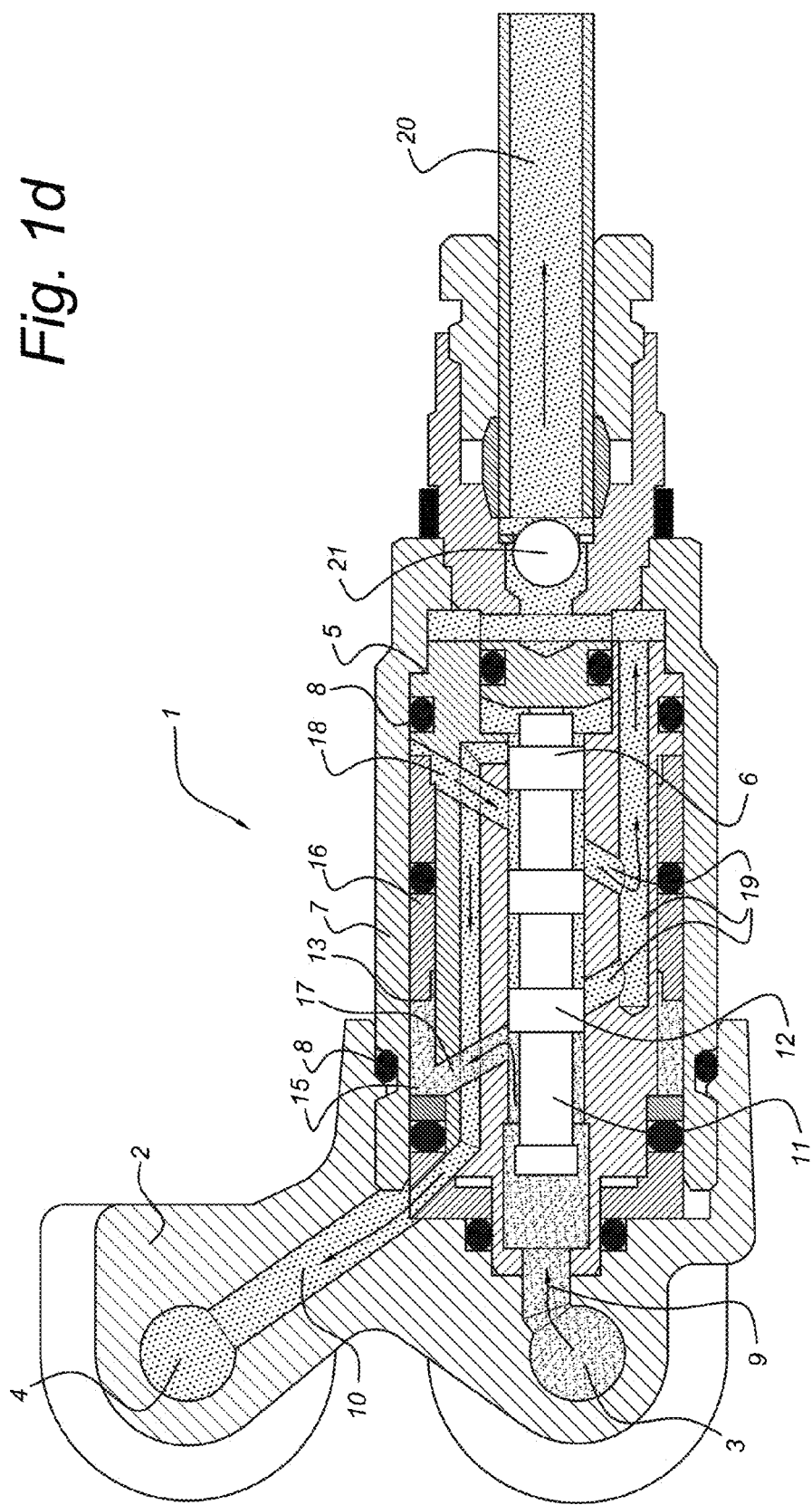
FIG. 1d shows the schematic cross section of the exemplary embodiment of the device of FIG. 1a in a fourth position in which a third fluid flow has flown into the first part of the first chamber and into the first part of the second chamber via the first inlet and via the first and third fluid communication means.

FIG. 1d shows that a third pressure pulse is exerted on the first inlet 3, while it is possible for pressure to be released through the second inlet 4. As a result, piston 11 will be moved from the first position shown in FIG. 1c back to the second position shown in FIG. 1d. By moving the piston 11 back to its second position, the first flow path for a third flow of the fluid to be proportioned between the first inlet 3 and the first part of the second chamber 14 via the first fluid communication means 9, the first end portion of the first chamber 6 and the third fluid communication means 17 is established again. In addition, the third flow path for the second flow of the fluid to be proportioned between the second inlet 4 and the second part of the second chamber 14 via the second fluid communication means 10, the second end portion of the first chamber 6 and the fourth fluid communication means 18 is closed off. In this way a second charge out of the second flow of fluid to be proportioned is established. The first part of the second chamber 14 may be filled with the third flow and the plunger 13 is moved back from the first position shown in FIG. 1c to the second position shown in FIG. 1d. At the same time, the second flow path between the second part of the second chamber 14 and the outlet 20 via the fourth fluid communication means 18, the first chamber 6 and the fifth fluid communication means 19 is established again. This time the second charge of fluid is thus dispensed at the outlet 20 for lubricating the bearing point.

Figure 1E:
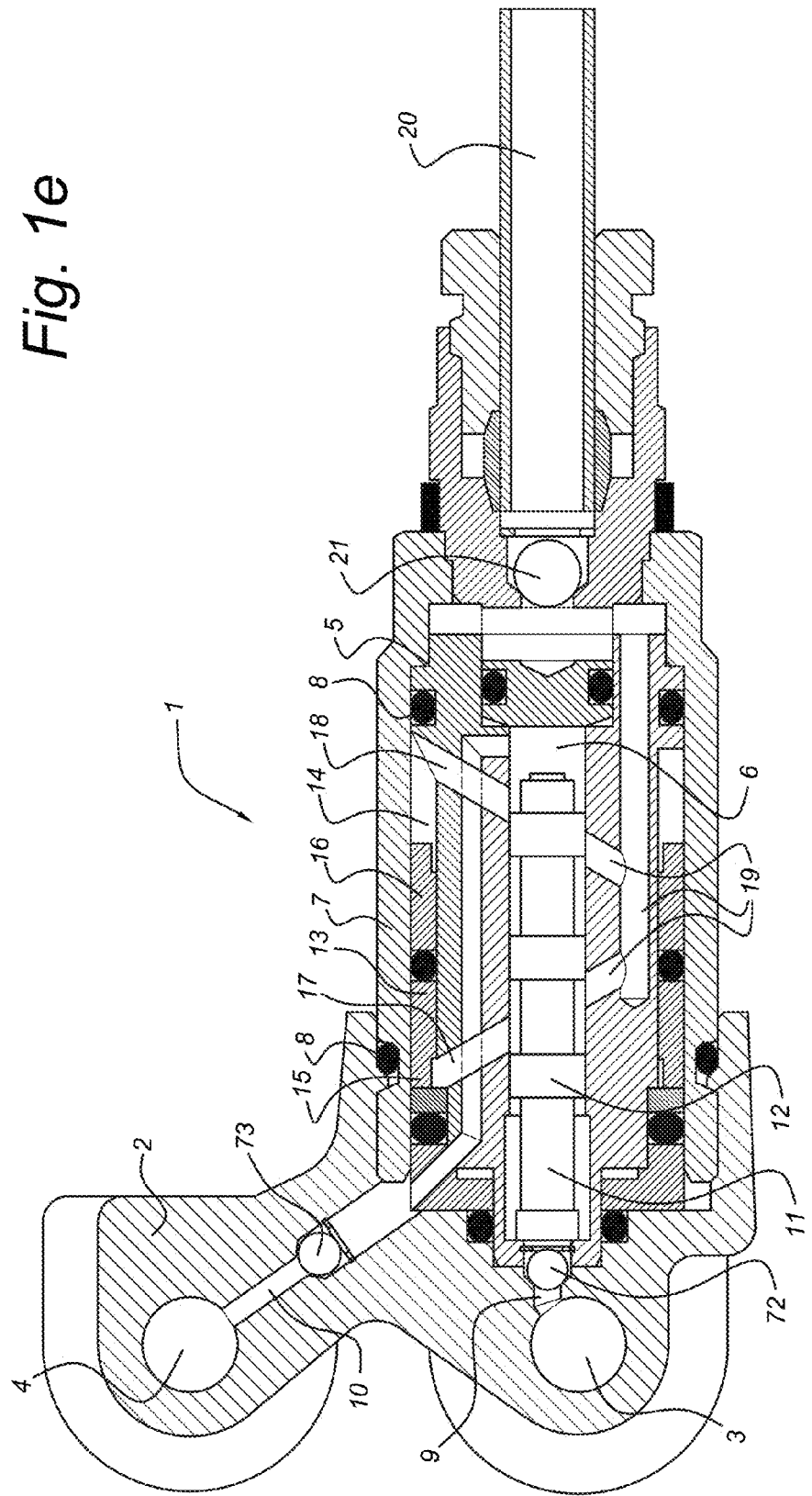
FIG. 1e shows a schematic cross section of another exemplary embodiment of the device according to the present invention while being in a first position in which no fluid is present inside the device.

FIG. 1e shows a schematic cross section of another exemplary embodiment of the device 1 according to the present invention while being in a first position in which no fluid is present inside the device 1. The skilled person will appreciate that this embodiment of the device 1 shown in FIG. 1e works in a same way as explained above in relation to the embodiment of the device 1 shown in FIGS. 1a-1d. This embodiment of the device 1 according to the invention shown in FIG. 1e comprises a second non-return valve 72 and a third non-return valve 73 that are provided between the first chamber 6 and respectively the first 9 and the second 10 fluid communication means to prevent flowing back of the first and second flows towards respectively the first 3 and the second 4 inlets. In this way undesired effects due to flowing back of fluid can be prevented.

In the exemplary embodiment of the device 1 shown in FIGS. 1a-1e the piston 11 and the plunger 13 are arranged for moving in the same direction.

Through the use of a two-line system it may be possible to control the to and fro movements of the piston 11 and the plunger 13 completely positively. The quantities of the first and second charges depend on dimensions of the plunger 13 with respect to dimensions of the second chamber 14, for example the height of the plunger 13 in longitudinal direction of the device 1. The longitudinal dimensions of the plunger 13 may be modified by providing for example fitting rings.

In general, if a lubrication pulse is necessary, pressure will alternately be exerted on each of the inlets 3, 4 for a specific period of time. This means that the way in which supply lines are connected to the inlets 3, 4 is not important as in both cases a charge of grease will be dispensed at the outlet 20 either during the first pressure pulse or during the second pressure pulse, and for example a bearing will be lubricated.

Figure 2:
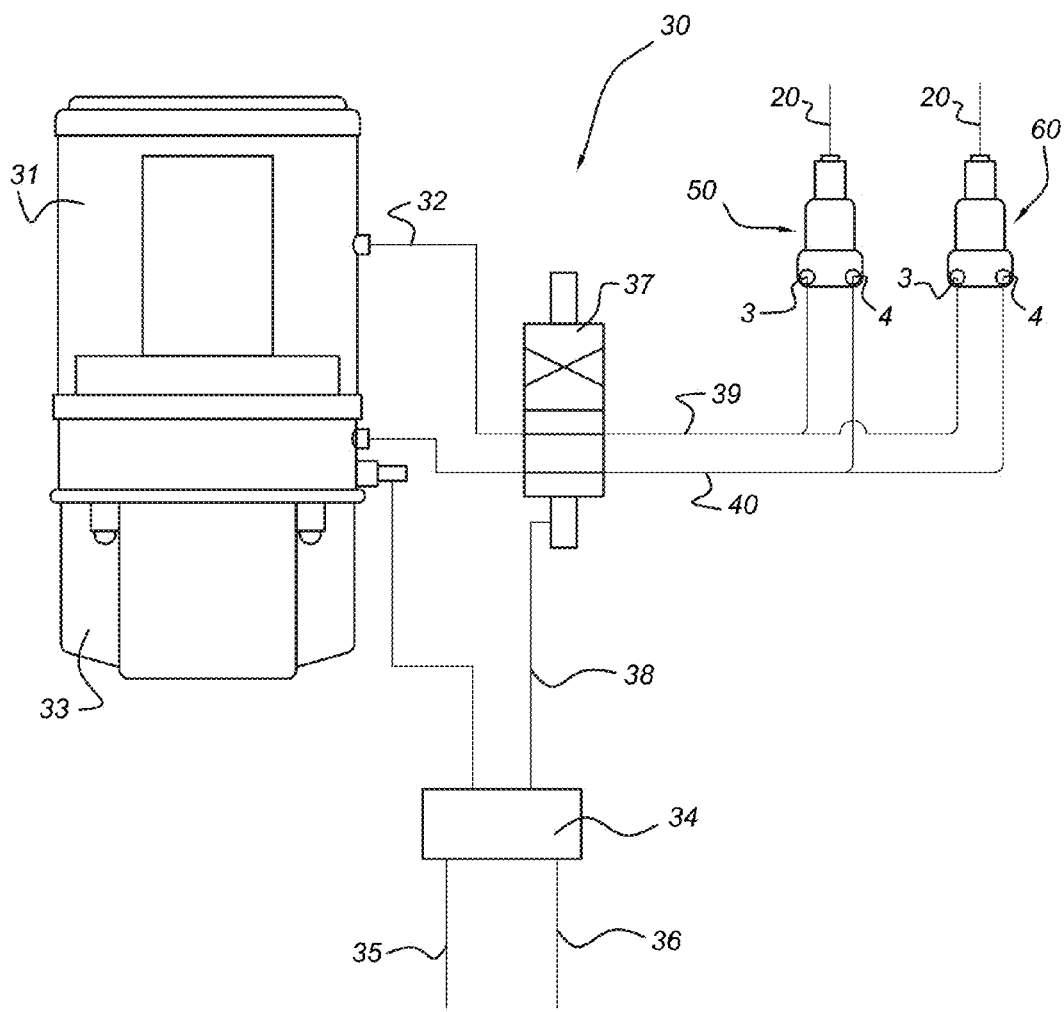
FIG. 2 shows diagrammatically the connection of the device shown in FIGS. 1a-1d to a grease lubricating system.

FIG. 2 shows diagrammatically the layout of an exemplary system 30 for dispensing charges of a fluid, e.g. grease, comprising two devices 1 according to the invention. This lubrication system 30 comprises a tank 31 containing grease, into which a discharge line 32 opens. Tank 31 comprises a pump 33, which is controlled by means of a control system 34, depending on input signals coming from lines 35 and 36. These signals can comprise, for example, a time circuit or in the case of motor vehicles a circuit which becomes active after a certain number of brake applications. A switching valve 37, for example a 4/2-way valve or a 5/2-way valve, is connected to control system 34 by means of a line 38. Lines 39 and 40 extend from switching valve 37. By means of switching valve 37, in a first position line 39 is connected to discharge line 32 and the fluid to be proportioned is pressed from the tank 31 into line 39 towards the devices 50, 60. In a second position line 40 is connected to discharge line 32 and the fluid to be proportioned is pressed from the tank 31 into line 40 towards the devices 50, 60. During intermittent operation of pump 33, pressure is exerted in this way on line 39 for a first period and on line 40 for a second period. In this exemplary embodiment of the system 30 according to the invention, line 39 is connected to the first inlets 3 of the devices 50, 60 and line 40 is connected to the second inlets 4 of the devices 50, 60. In the exemplary embodiment of the system 30 shown in FIG. 2 two devices 50, 60 have been connected in series. It will be clear to the skilled person that the number of devices that can be connected in series can be increased. This enables, irrespective of the type of grease used or the size of the lines, to ensure that a predetermined quantity of grease is supplied to each point that should periodically be lubricated. It is also possible to extend or reduce the system 30 as desired, without this having an effect on the operating devices 50, 60. This enhances flexibility of the system 30.

It should be noted that the above-mentioned exemplary embodiments of respectively the device 1 and the system 30 merely illustrate rather than limit the invention. Those skilled in the art will be able to design many alternative embodiments of the device and/or system without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

In the device claim enumerating several means, several of these means may be embodied by one and the same item of hardware. The mere fact that certain measures are recited in mutually different dependent claims does not indicate that a combination of these measures cannot be used to advantage. The scope of protection sought is determined by the following claims within the scope of which many modifications can be envisaged.

The invention claimed is:

1. Device for dispensing charges of a fluid comprising a housing (2) provided with
    a first inlet (3) arranged for allowing a first flow of a fluid to be proportioned to flow into the device (1);
    a second inlet (4) arranged for allowing a second flow of said fluid to flow into the device (1);
    a first fluid communication means (9) that is arranged for establishing fluid communication between the first inlet (3) and a first chamber (6);
    a second fluid communication means (10) that is arranged for establishing fluid communication between the second inlet (4) and the first chamber (6);
    a piston (11) that is provided in the first chamber (6) and is arranged for keeping the first and the second flows separated;
    a plunger (13) that is provided in a second chamber (14) and is arranged for establishing alternately a first charge out of the first flow and a second charge out of the second flow;
    an outlet (20) for said first and second charges; and
    a third (17), a fourth (18) and a fifth (19) fluid communication means that are arranged for enabling fluid communication between the first (6) and the second (14) chambers and the outlet (20), wherein the third (17), the fourth (18) and the fifth (19) fluid communication means, the piston (11) and the plunger (13) are arranged for alternately dispensing the first and the second charges at the outlet (20) of the device (1).

2. Device according to claim 1, wherein the third (17), fourth (18) and the fifth (19) fluid communication means, the piston (11) and the plunger (13) are arranged for dispensing the first charge at the outlet (20) depending on the second flow flowing into the device (1) via the second inlet (4) and for successively dispensing the second charge at the outlet (20) depending on the first flow flowing into the device via the first inlet (3).

3. Device according to claim 1, wherein the piston (11) and the plunger (13) are arranged for being movable alternately by the first and the second flows.

4. Device according to claim 3, wherein the piston (11) and the plunger (13) are arranged for moving in a same direction.

5. Device according to claim 1, wherein quantities of the first and/or second charges depend on dimensions of the plunger (13) with respect to dimensions of the second chamber (14).

6. Device according to claim 1, wherein the first inlet (3) being connected with a first end portion of the first chamber (6) via the first fluid communication means (9) and the second inlet (4) being connected with a second end portion of the first chamber (6) via the second fluid communication means (10), wherein the plunger (13) defining at a first side (15) of the plunger a first part of the second chamber (14) and defining at a second side (16) of the plunger a second part of the second chamber (14), wherein the first side (15) of the plunger (13) is arranged for being controllable by the first flow of the fluid to be proportioned and the second side (16) of the plunger (13) is arranged for being controllable by the second flow of said fluid, wherein the third fluid communication means (17) is arranged for connecting the first chamber (6) with the first part of the second chamber (14), wherein the fourth fluid communication means (18) is arranged for connecting the first chamber (6) with the second part of the second chamber (14), wherein the fifth fluid communication means (19) is arranged for connecting the first chamber (6) with the outlet (20), wherein the piston (11) and the plunger (13) are arranged for being movable by the first flow of the fluid to be proportioned in a first direction providing a first flow path for said first flow between the first inlet (3) and the first part of the second chamber (14) via the first (9) and the third (17) fluid communication means and a second flow path for the second charge of the fluid to be proportioned between the second part of the second chamber (14) and the outlet (20) via the fourth (18) and the fifth (19) fluid communication means, wherein the piston (11) and the plunger (13) being movable by the second flow of the fluid to be proportioned in a second direction providing a third flow path for said second flow between the second inlet (4) and the second part of the second chamber (14) via the second (10) and the fourth (18) fluid communication means and a fourth flow path for the first charge of the fluid to be proportioned between the first part of the second chamber (14) and the outlet (20) via the third (17) and the fifth (19) fluid communication means.

7. Device according to claim 1, wherein a first non-return valve is provided between the outlet (20) and the fifth fluid communication means (19) to prevent the first and the second charges from flowing back into the device via the fifth fluid communication means (19).

8. Device according to claim 1, wherein a second and a third non-return valve are provided between the first chamber (6) and respectively the first (9) and the second (10) fluid communication means to prevent flowing back of the first and second flows towards respectively the first (3) and the second (4) inlets.

9. Device according to claim 1, wherein the piston (11) comprises a first side arranged for being controllable by the first flow of the fluid to be proportioned and a second side arranged for being controllable by the second flow of said fluid.

10. Device according to claim 1, wherein the piston (11) is provided with protrusions (12) that are in adjoining contact with an inner wall of the first chamber (6).

11. Device according to claim 1, wherein the piston (11) is accommodated in a sleeve forming the first chamber (9) and the plunger (13) is accommodated in an annular space between the sleeve and a first part (7) of the housing (2) forming the second chamber (14).

12. System for dispensing charges of a fluid comprising at least one device (50, 60) according to claim 1.

* * * * *